Aug. 19, 1947.  D. D. FEHR  2,426,086
FREE-WINGED AIRCRAFT
Filed July 17, 1944  2 Sheets-Sheet 1

INVENTOR:
David D. Fehr
BY:
his Attys.

Aug. 19, 1947.  D. D. FEHR  2,426,086
FREE-WINGED AIRCRAFT
Filed July 17, 1944  2 Sheets-Sheet 2

INVENTOR:
By: David D. Fehr
his Attys.

Patented Aug. 19, 1947

2,426,086

UNITED STATES PATENT OFFICE 2,426,086

FREE-WINGED AIRCRAFT

David D. Fehr, Winkler, Manitoba, Canada

Application July 17, 1944, Serial No. 545,238

2 Claims. (Cl. 244—49)

My invention relates to heavier-than aircraft, an object thereof being to provide an air carrier which, when grounded, will not require the considerable amount of space which is required to take care of the wing-spread of conventional aircraft.

A further object of my invention is to provide an air carrier in which the wings automatically and gradually spread while the craft is taxiing to a take-off, and automatically fold after alighting, thus avoiding the necessity for manual folding of the wings or detachment of the wings such as is necessary in conventional folding wings and detachable wing aircraft.

A further object of my invention is to provide an aircraft of the character herewithin described wherein the wings are of such section as will make the craft unstallable and such that in the event of engine trouble while in flight, the same can be made to depend substantially like a parachute, or may be gently planed earthward according to the desires of the pilot.

A further object of my invention is to provide an aircraft which is of conspicuously simplified construction, and is simple to operate.

With the above more important objects in view and such other minor objects as may appear as the specification proceeds, my invention consists essentially in the arrangement and construction of parts all as hereinafter more particularly described, reference being had to the accompanying drawings, in which.

In the drawings like characters of reference indicate corresponding parts in the different figures.

Figure 2:
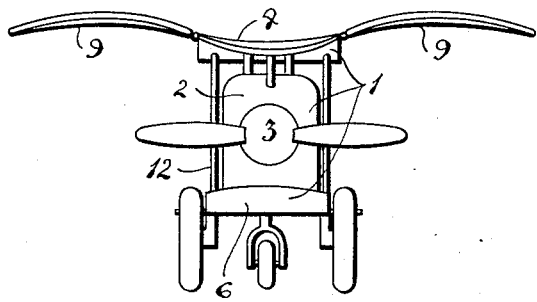
Figure 2 is an elevation as viewed from the nose also showing my aircraft with wings outspread.
Figure 4:
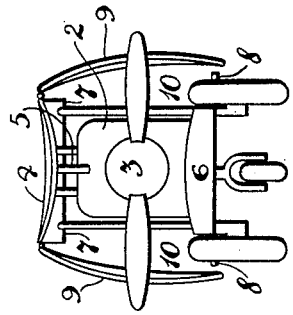
Figure 4 is a view similar to Figure 2 but illustrating the wings pendant as would be the case when the craft is grounded and stationary.

The longitudinal central structure collectively enumerated 1 of my aircraft comprises a fuselage 2 at the front end of which is a conventional propeller assembly 3. Additionally the said central structure includes an elongated central aerofoil 4 preferably slightly concave upon the upper surface thereof as illustrated in Figures 2 and 4, and inclining downwards slightly at the front and rear ends. This aerofoil is secured in spaced relation to the top surface of the fuselage 2 by means of the several standards 5.

Figure 3:
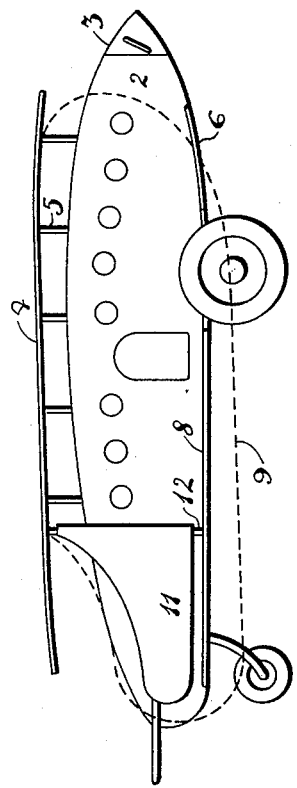
Figure 3 is a side elevation of my aircraft.

The said central structure also includes the underplane 6 which is an elongated member and is secured against the undersurface of the fuselage in line thereof similarly to the aerofoil aforesaid, and as will be seen from Figures 2, 3 and 4 is slightly inclined at the nose end of the craft.

The aerofoil 4 is somewhat wider than the fuselage, and the projecting edges thereof I refer to as eaves 7. The underplane also is of somewhat greater width than the fuselage, thereby providing what I term flanges 8 along the side walls of the fuselage, one flange of which may be used as a catwalk for passengers if desired.

The wings 9 of my aircraft are freely hinged to the eaves 7, and when the craft is grounded and stationary, the wings are pendant and hang freely downwards as illustrated in Figure 4. The longitudinal faces on either side of the fuselage are bounded by the upper end undersurfaces of the flanges 8 and the eaves 7 respectively, and by the fuselage side walls and the inner surfaces of the wings form slip stream tunnels 10.

Figure 1:
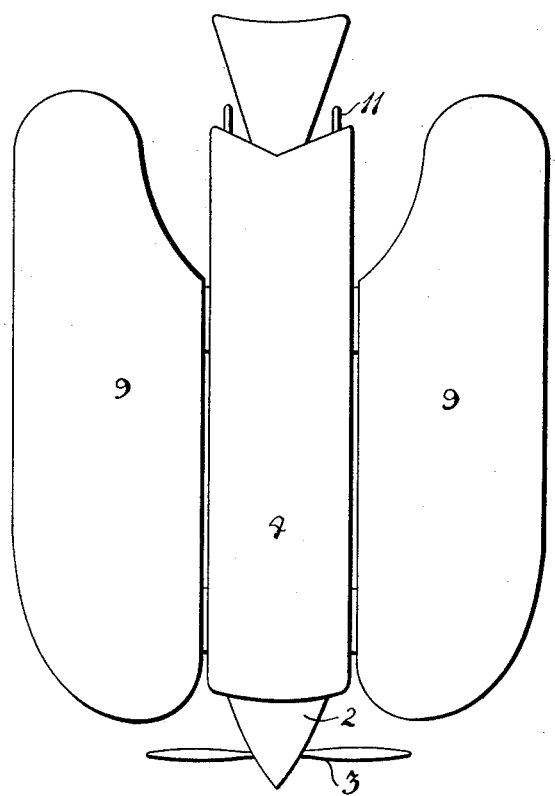
Figure 1 is a plan view of my free-winged aircraft with the wings outspread.

As the propeller increases its rate of revolutions, the craft will move forwardly, and the increasing pressure of the slip stream upon the propeller will gradually force the wings outwardly and upwardly until they are fully elevated as per Figures 1 and 2. Shortly after the wings have become fully elevated, the craft will become airborne and obviously the wings will remain extended while the craft is in flight.

Upon alighting, obviously a reverse action will take place, and should trouble develop while aloft, it is obvious that a craft supported from end to end by wings substantially as herein designed, is unstallable, and may therefore be brought to ground either in a straight or curved planing course or parachute-wise according to manipulation of the horizontal and vertical stabilisers.

In association with the craft herein described, it will be noted that I have provided horizontal stabilisers 11 differing somewhat from conventional form and made possible by virtue of the aerofoil and underplane described, the said stabilisers being positioned on either side of the fuselage spaced at the rear end thereof and being horizontally rotatable upon vertical shafts 12 either journalled or fixed at the upper and lower ends thereof in the eaves 7 of the aerofoil 4 and the flanges 8 of the underplane 6 respectively.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the scope of the accompanying claims without departing from the spirit and scope of the same it is intended that all matter contained in the accompanying specification shall be interpreted as illustrative only and not in a limiting sense and I desire only such limitations placed thereon as justice dictates.

What I claim as my invention is:

1. An aircraft characterised by having wings extending the greater portion of the length of the fuselage thereof, elongated eaves projecting from said fuselage at either side thereof substantially in the plane of the roof of said fuselage, said wings being freely hinged to said eaves, flanges projecting from said fuselage at either side and substantially for the length thereof, and substantially in the plane of the undersurface of said fuselage, a propeller at the front end of said fuselage, said wings depending downwardly when said aircraft is grounded and stationary, the inner surfaces of said wings when pendant together with the under and upper surfaces of said eaves and flanges respectively providing a substantially unobstructed slip stream tunnel through which air from said propeller is forced to lift said wings gradually as the craft taxies towards the take-off point, said wings being fully extended by the time the craft becomes air-borne.

2. An aircraft characterised by having wings extending the greater portion of the length of the fuselage thereof, an elongated central aerofoil spaced above and in line with said fuselage, said wings being freely hinged to the longitudinal edges of said aerofoil, an elongated underplane including flanges extending substantially the length of said fuselage and projecting upon either side thereof, a propeller at the front end of said fuselage, said wings depending downwardly when said aircraft is grounded and stationary, the inner surfaces of said wings when pendant providing with the under surface of said central aerofoil and the upper surfaces of said flanges a substantially unobstructed slip stream tunnel through which air from said propeller is forced to lift said wings gradually as the craft taxies towards the take-off point, said wings being fully extended by the time the craft becomes air-borne.

DAVID D. FEHR.

REFERENCES CITED

The following references are of record in the file of this patent:

UNITED STATES PATENTS

| Number | Name | Date |
|---|---|---|
| 1,324,996 | Cartus | Dec. 16, 1919 |

FOREIGN PATENTS

| Number | Country | Date |
|---|---|---|
| 21,898 | Great Britain, 1914 | Jan. 28, 1915 |